(12) United States Patent
Weber (10) Patent No.: US 9,068,650 B2
(45) Date of Patent: Jun. 30, 2015

(54) SHIFT CONTROL AND METHOD (75) Inventor: Michael A. Weber, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 231 days.

(21) Appl. No.: 13/588,804

(22) Filed: Aug. 17, 2012

(65) Prior Publication Data

US 2014/0052351 A1 Feb. 20, 2014

(51) Int. Cl.
*G06F 7/00* (2006.01)
*F16H 61/02* (2006.01)
*F16H 59/44* (2006.01)
*F16H 59/02* (2006.01)
*E02F 9/20* (2006.01)

(52) U.S. Cl.
CPC ............ *F16H 61/0213* (2013.01); *F16H 59/44* (2013.01); *F16H 59/02* (2013.01); *F16H 2061/022* (2013.01); *E02F 9/2079* (2013.01)

(58) Field of Classification Search
CPC ..... F16H 61/061; F16H 37/022; F16H 61/12; F16H 61/66259; B60W 10/06
USPC .......................................... 701/50, 51, 58, 70
See application file for complete search history.

(56) References Cited

U.S. PATENT DOCUMENTS

| | | | |
|---|---|---|---|
| 5,406,483 A * | 4/1995 | Kallis et al. ...................... | 701/53 |
| 6,496,767 B1 * | 12/2002 | Lorentz ............................ | 701/55 |
| 7,637,845 B2 | 12/2009 | Strashny et al. | |
| 7,641,588 B2 * | 1/2010 | Thomson et al. ............. | 477/108 |
| 8,645,033 B2 * | 2/2014 | Steen et al. ...................... | 701/58 |
| 2003/0029261 A1 * | 2/2003 | DeJonge .......................... | 74/335 |
| 2004/0249541 A1 * | 12/2004 | Kim ................................. | 701/51 |
| 2006/0035691 A1 * | 2/2006 | Nystrom et al. .................. | 463/6 |
| 2006/0288812 A1 * | 12/2006 | Okawa ............................ | 74/335 |
| 2008/0294317 A1 * | 11/2008 | Cho ................................ | 701/51 |
| 2009/0037058 A1 * | 2/2009 | Senneff et al. .................. | 701/50 |
| 2010/0121543 A1 * | 5/2010 | Landes et al. ................... | 701/54 |
| 2010/0234177 A1 * | 9/2010 | Lauri et al. ....................... | 477/79 |
| 2011/0297462 A1 * | 12/2011 | Grajkowski et al. ......... | 180/54.1 |
| 2012/0078479 A1 * | 3/2012 | Sugiura et al. .................. | 701/55 |
| 2012/0150390 A1 * | 6/2012 | Ruhter et al. ................... | 701/42 |
| 2012/0226422 A1 * | 9/2012 | Jacobson et al. ................ | 701/58 |

FOREIGN PATENT DOCUMENTS

| | | |
|---|---|---|
| JP | 2012072810 | 4/2012 |
| KR | 100507489 | 8/2005 |
| WO | 2011153494 | 12/2011 |

* cited by examiner

*Primary Examiner* — Helal A Algahaim
*Assistant Examiner* — Shardul Patel
(74) *Attorney, Agent, or Firm* — Leydig, Voit & Mayer, Ltd.

(57) ABSTRACT

A machine has a power train including a prime mover connected to a transmission having two or more selectable gear settings, and a user interface providing an operator selection of at least two gear identifiers of a whole number. Each whole number gear identifiers corresponds to high idle speeds for respective gear settings. The user interface provides a signal indicative of selected gear identifier to an electronic controller, which also receives and transmits signals indicative of machine parameters. The electronic controller contains computer executable instructions which determine an optimal gear setting and whether a gear shift should be made.

20 Claims, 5 Drawing Sheets

| Gear Identifier | Track Speed (mph) |
|---|---|
| 0.5 | 1.40 |
| 1.0 | 2.75 |
| 1.5 | 3.80 |
| 2.0 | 4.90 |
| 2.5 | 6.80 |
| 3.0 | 8.60 |

FIG. 5

SHIFT CONTROL AND METHOD

TECHNICAL FIELD

This patent disclosure relates generally to powertrains having an engine connected to a transmission and, more particularly, to a powertrain having an adaptive shift control and/or a shift indicator such that the power train may operate more efficiently.

BACKGROUND

Transmissions typically control gear ratio changes in accordance with a shift map or based on gear selections by an operator. Specifically for work machines, such as tractors and motor graders, transmission may incorporate automatic shifts to maintain a desired groundspeed. However, when the machine is working, the operators will typically disable the automatic shifting to ensure that the machine will have sufficient torque to, for example, overcome obstacles such as boulders and the like, and to travel on inclines, and the like.

Power trains that include transmissions connected to engines through torque converters, and/or other components, can often operate at different gear ratios, engine speeds, and torque converter settings to provide a substantially constant ground speed for the machine, which is selected by an operator. Any one of several different combinations of engine speed and transmission gear ratio may provide a desired groundspeed. Because of this inherent flexibility, although an operator may select an appropriate gear ratio to perform a machine function, such selection may not always be the most efficient from the operating standpoint of the machine, which can result in increased noise and reduced fuel efficiency.

One example of an automatically shifting transmission can be seen in U.S. Pat. No. 6,496,767 (the '767 patent), which issued on Dec. 17, 2002. The '767 patent describes a method for determining shift points in a step gear transmission system that maximizes fuel economy. The method uses fuel economy data from various gear ratios to calculate decision curves. These decision curves are then used during operation to minimize fuel consumption while maintaining a desired ground speed.

While varied gear ratios and speeds may be effective in reducing fuel consumption or improving overall operating efficiency of a machine under a broad range of operating conditions, the overall value of the machine may be minimized if operators are unwilling or unable to adjust to new arrangements.

SUMMARY

In one aspect, the present disclosure describes a machine having a power train that includes a prime mover connected to a transmission having at least two selectable gear settings. The machine's user interface is adapted to provide an operator with a selection of at least two gear identifiers of a whole number. Each whole number gear identifier corresponds to a high idle speed for a respective gear setting directly corresponding to the selected gear identifier. The user interface provides a signal indicative of the gear identifier selected, which is received by an electronic controller. The electronic controller is also configured to receive and transmit signals indicative of machine parameters. The electronic controller contains computer executable instructions for determining an optimal gear setting and whether a gear shift should be made.

In another aspect, the disclosure describes a method for operating a machine having an engine connected to a multi-gear power-shift transmission, the engine operating at a current engine speed and providing a current torque. The method includes receiving a signal indicative of a gear identifier selected from a user interface adapted to provide an operator with a selection of at least two gear identifiers of a whole number. Each whole number gear identifier corresponds to a high idle speed for a respective gear setting directly corresponding to the selected gear identifier. The method further includes receiving signals indicative of at least one machine parameter including ground speed, executing a control logic to determine an optimal gear setting and whether a gear shift should be made, and providing an indication if a gear shift from a current gear setting to an alternate gear setting is desired based upon the gear identifier selected.

In yet another aspect, the disclosure describes a power train including an engine connected to a multi-gear power-shift transmission, the transmission adapted to operate a drive system at a desired ground speed and power output. The power train further includes an electronic controller configured to receive a signal indicative of a gear identifier selected from a user interface. The user interface provides an operator with a selection of at least two gear identifiers of a whole number, each whole number gear identifier corresponding to a high idle speed for a respective gear setting directly corresponding to the selected gear identifier. The electronic controller also receives signals indicative of at least one machine parameter including ground speed, and executes a control logic to determine an optimal gear setting and whether a gear shift should be made. The electronic controller then provides an indication to initiate a gear shift if the gear shift from the current gear setting to an alternate gear setting is desired based upon the gear identifier selected.

DETAILED DESCRIPTION

This disclosure relates to transmissions for use in power trains and, more particularly, to transmissions used in power trains for machines. Although a particular type of machine is illustrated and described hereinafter, the term "machine" may refer to any machine that performs some type of operation associated with an industry such as mining, construction, farming, transportation, marine or any other industry known in the art. For example, a machine may be an earth-moving machine, such as a wheel loader, excavator, dump truck, backhoe, motor grader, material handler, or another type of machine, such as a locomotive, paver or the like. Similarly, although an exemplary blade is illustrated as the attached implement of the machine shown herein, an alternate implement may be included. Any implements may be utilized and employed for a variety of tasks, including, for example, loading, compacting, pushing, lifting, brushing, and include, for example, buckets, compactors, forked lifting devices, brushes, grapples, cutters, shears, blades, breakers/hammers, augers, tillers, rippers, and others.

Figure 1:
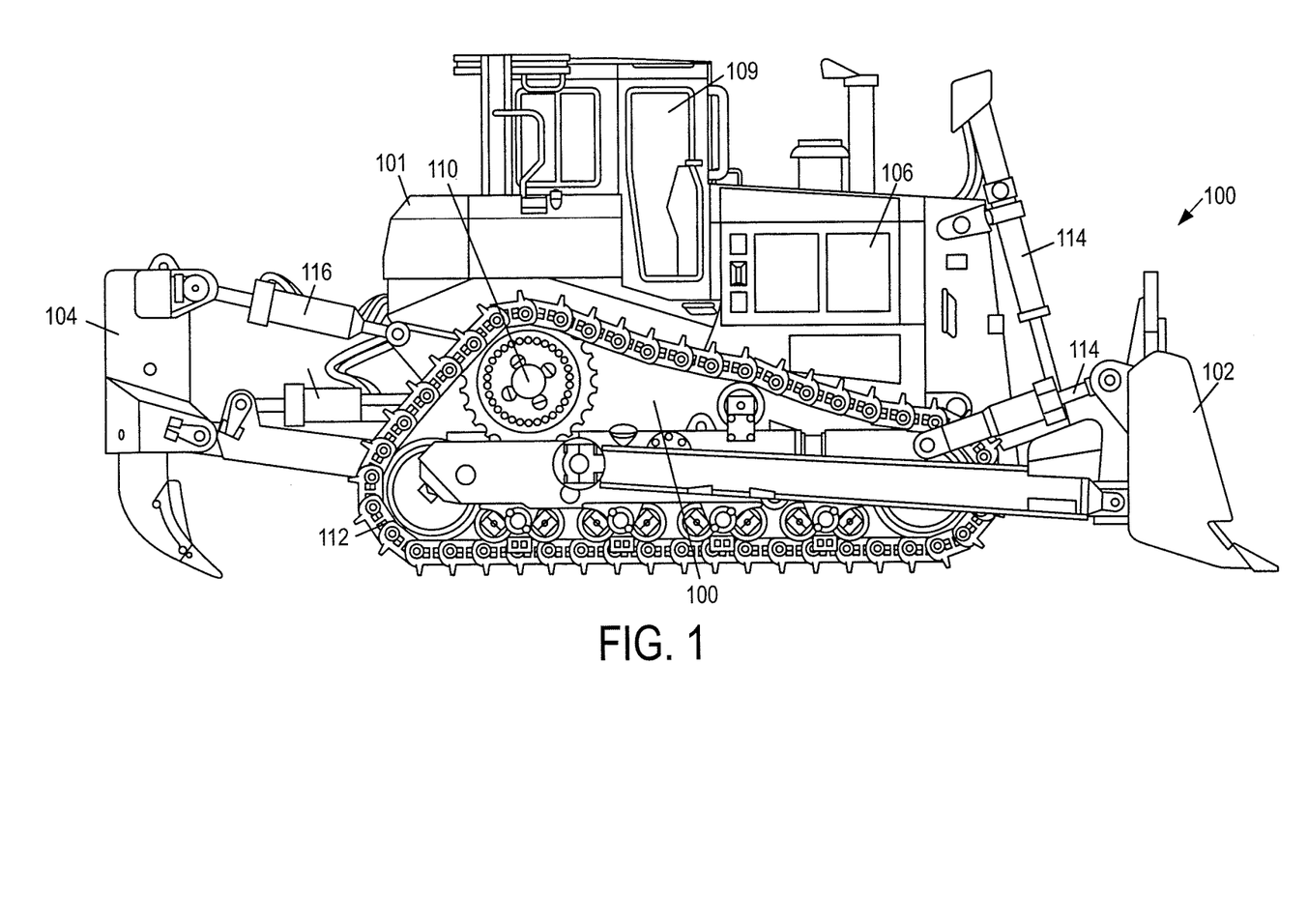
FIG. 1 is an outline view of a machine in accordance with the disclosure.

An outline view of a machine 100 is shown in FIG. 1. The machine 100 is shown as a track-type tractor 101 having a bulldozer blade 102 and a ripper 104 as implements, although other work implements may be used. The track-type tractor 101 includes an engine 106 connected to a chassis 108. A cab 109 is connected to the chassis 108. The engine 106 provides power to operate drive sprockets 110 that cause tracks 112 to selectively rotate and propel the track-type tractor 101 along. The engine 106 further provides power to operate the various implements, such as actuators 114 and 116 that can selectively position the blade 102 and the ripper 104 relative to the chassis 108. The power provided by the engine 106 is mechanical power, which may be transferred to various components and systems of the machine 100, for example, by use of drive train components. Additionally or alternatively, engine power may be transformed to other forms of power, such as electrical, hydraulic and the like. In the illustrated embodiment, the drive sprockets are mechanically coupled to an output shaft of the engine 106 through various power transmission components, some of which are described hereinafter. The actuators 114 and 116 are configured to receive pressurized hydraulic fluid that is compressed by a pump that receives mechanical power from the engine 106.

Figure 2:
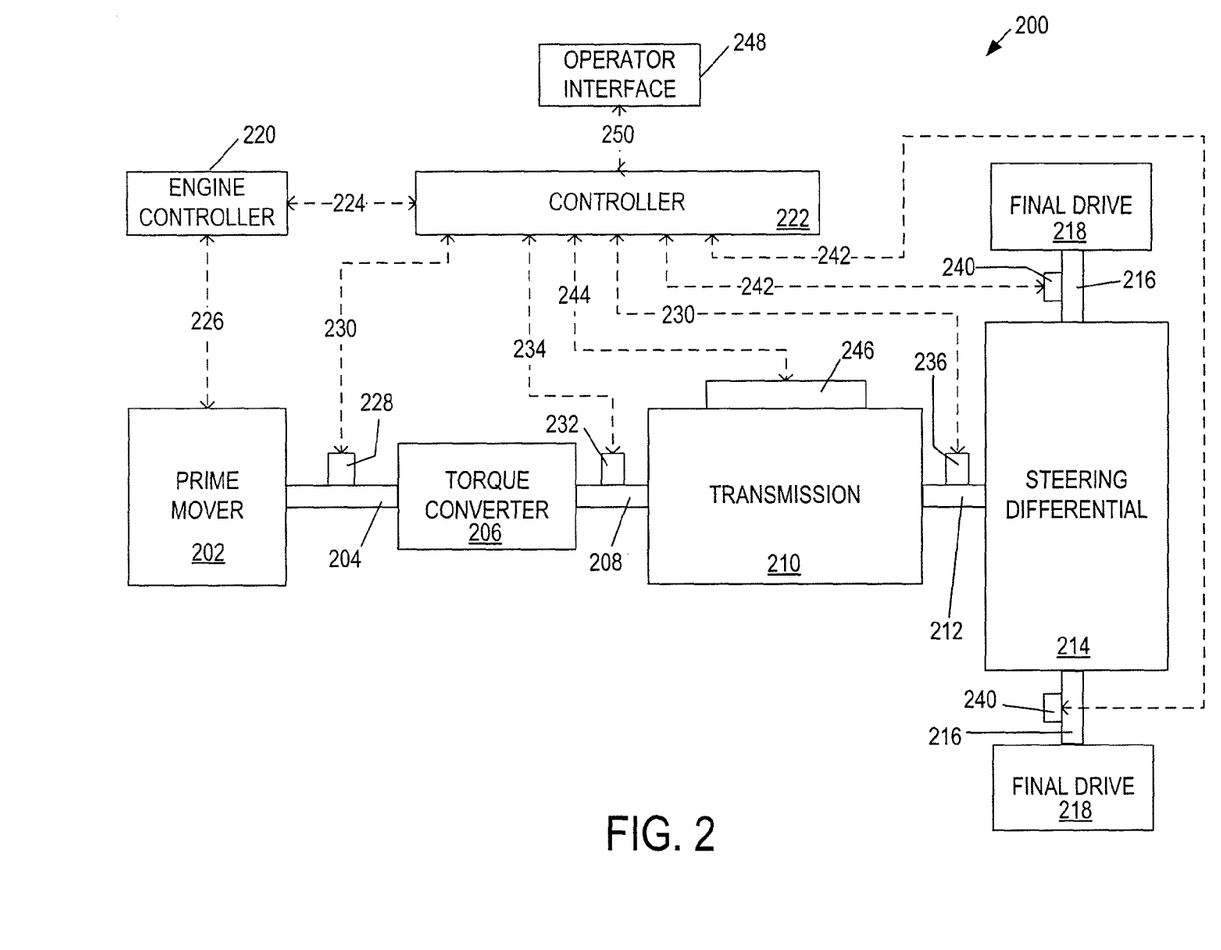
FIG. 2 is a block diagram of a power train for a machine in accordance with the disclosure.

A block diagram of a power train 200 of the machine 100 is shown in FIG. 2. The power train 200 includes a prime mover 202. The prime mover 202 may be an engine, for example, the engine 106 (FIG. 1), or another type of device, such as an electric motor, a hydraulic actuator, and others. The prime mover 202 has an output shaft 204 capable of powered rotation. The output shaft 204 is connected to a torque converter 206. The torque converter 206 is a device configured to provide multiplication of an input torque. In the illustrated embodiment, the torque converter 206 multiplies the torque provided by the prime mover 202, via the shaft 204, to a transmission input shaft 208. The torque converter 206 may be any appropriate type of torque converter device such as a viscous fluid device and the like. The torque converter 206 may alternatively be a torque transfer device, such as a clutch, which may replace or be used in addition to a viscous-fluid torque transfer device.

The transmission input shaft 208 is configured to transfer torque and, in general, mechanical power, to a transmission 210. The transmission 210 illustrated in FIG. 2 is a power shift transmission that includes a series of planetary gears that can selectively provide predetermined gear ratios between the transmission input shaft 208 and a transmission output shaft 212. In the illustrated embodiment, the transmission 210 is configured to provide three gear ratios for forward motion and three gear ratios for reverse motion of the machine 100. Each gear set of the transmission may use large-diameter, high capacity, oil-cooled clutches (not shown) to selectively engage the various gear sets that provide a desired gear ratio during operation.

The output shaft 212 of the transmission 210 is configured to provide motive power to ground engaging elements, for example, the tracks 112 (FIG. 1), that move the machine 100 along. The motive power may be provided in any appropriate form. In the case of skid-steer machines, such as the track-type tractor 101, various arrangements may be used to selectively power each track of the machine such that the machine can steer. In the illustration of FIG. 2, the output shaft 212 is connected to a steering differential 214, but other arrangements may be used. The steering differential 214 includes planetary gear arrangements that can selectively cause the machine to turn by speeding up one track and slowing the other while maintaining full power to both tracks. The steering differential 214 includes two drive shafts 216, each connected to a final drive 218 that is configured to move the machine 100. In reference to FIG. 1, each final drive 218 may be connected to a respective drive sprocket 110 and configured to drive one of the two tracks 112.

The operation of the various components and systems of the power train 200 is controlled by electronic controllers. Accordingly, the power train 200 includes an engine controller 220 that communicates with a controller 222 via an interface 224. The electronic controllers 220 and 222 may be a single controller or may include more than two controllers disposed to control various functions and/or features of the machine 100. For example, the controller 222 may be part of a master controller, used to control the overall operation and function of the machine, that is cooperatively implemented with the engine controller 220. In this embodiment, the term "controller" is meant to include one, two, or more controllers that may be associated with the machine 100 and that may cooperate in controlling various functions and operations of the machine 100 (FIG. 1). The functionality of the controller (s), while shown conceptually in the description of FIG. 3 that follows to include various discrete functions for illustrative purposes only, may be implemented in hardware and/or software without regard to the discrete functionality shown. Accordingly, various interfaces of the controller are described relative to components of the power train 200 shown in the block diagram of FIG. 2. Such interfaces are not intended to limit the type and number of components that are connected, nor the number of controllers that are described.

Accordingly, the engine controller 220 is connected to the prime mover 202 via an engine interface 226. The engine interface 226 includes multiple communication channels that are configured to communicate signals and commands between the controller 220 and various components, systems and actuators of the prime mover 202. For example, in embodiments where the prime mover 202 is an internal combustion engine, the engine interface 226 may provide commands that control the speed and load output of the engine. In embodiments where the prime mover 202 is an electric motor (not shown), a command setting the speed of the motor may be sent from the controller 220. Information provided to the controller 220 from the engine may include signals indicative of engine speed (RPM), engine load, temperature of various components, and the like.

The controller 222 is connected to various sensors of the power train 200 that provide information indicative of the operation of the power train 200. Although certain sensor connections are illustrated and described herein to separately extend between the controller 222 and each of the sensors discussed, any appropriate communication scheme may be used, for example, a controller area connection bus may be used to collect information from various sensors and provide it to the controller. Based on the information received from the various sensors, the controller 222 is configured to suggest and/or affect gear shifts that can promote the efficient operation of the machine 100. More specifically, the controller 222 is connected to an engine speed sensor 228 via an engine speed communication line 230. Similarly, the controller 222 is connected to a torque converter speed sensor 232 via a torque converter speed communication line 234, and to a transmission speed sensor 236 via a transmission speed communication line 238. Final drive speed sensors 240 are connected to the controller 222 via final drive speed communication lines 242. Each of these and other sensors are configured to provide to the controller 222 signals indicative of the parameter measured by each sensor.

The controller 222 is further configured to effect gear changes such that predetermined gear ratios are employed at the transmission 210. In this way, the controller 222 is arranged to provide commands via a shift command line 244 to a shift actuator 246 of the transmission 210. The shift actuator 246 may include various components and systems configured to selectively cause the engagement of devices, such as clutches and/or gears that are internal or external to the transmission 210. The selective engagement of such devices can provide a desired gear ratio between the input shaft 208 and the output shaft 212 of the transmission 210.

During operation, the engine controller 220 and the controller 222 can cooperate in operating the power train 200 under parameters dictated by an operator of the machine 100, for example, by depressing various pedals, setting a desired machine speed, manipulating the position and operation of various machine implements, steering the machine, and so forth. Sensors and other devices (not shown) are disposed to transduce the operator's commands into signals that are then communicated to the controller 222 in a known fashion. In the illustrated embodiment, an operator interface 248 is connected to the controller 222 via a communication line 250. The operator interface 248 may include a configurable display that provides visual indication of various machine parameters and/or operating modes, and may further include one or more input devices, such as buttons, rollers, a keyboard, and the like that can be manipulated by the operator to provide input commands to the controller 222. For example, the operator interface 248 may include an input arrangement for identification of various efficiency parameters, such as, for example, fuel consumption of the prime mover, expected noise generated by the prime mover, power output of the prime mover, emissions generated by the prime mover, and expected changes in power consumption of the machine; the operator interface 248 may provide a signal indicative of the same to the controller 222 via the communication line 250. By way of further example, the operator can select between a manual shifting mode, a semi-automatic shifting mode or an automatic shifting mode of the machine 100 by appropriately manipulating the controls of the operator interface 248. Operation of an automatic shifting mode may be as disclosed, for example, in U.S. application Ser. No. 13/049,214, which was filed on Mar. 16, 2011, and claims priority to U.S. Provisional Patent Application 61/448,035, both of which are incorporated herein in their entirety.

Figure 3:
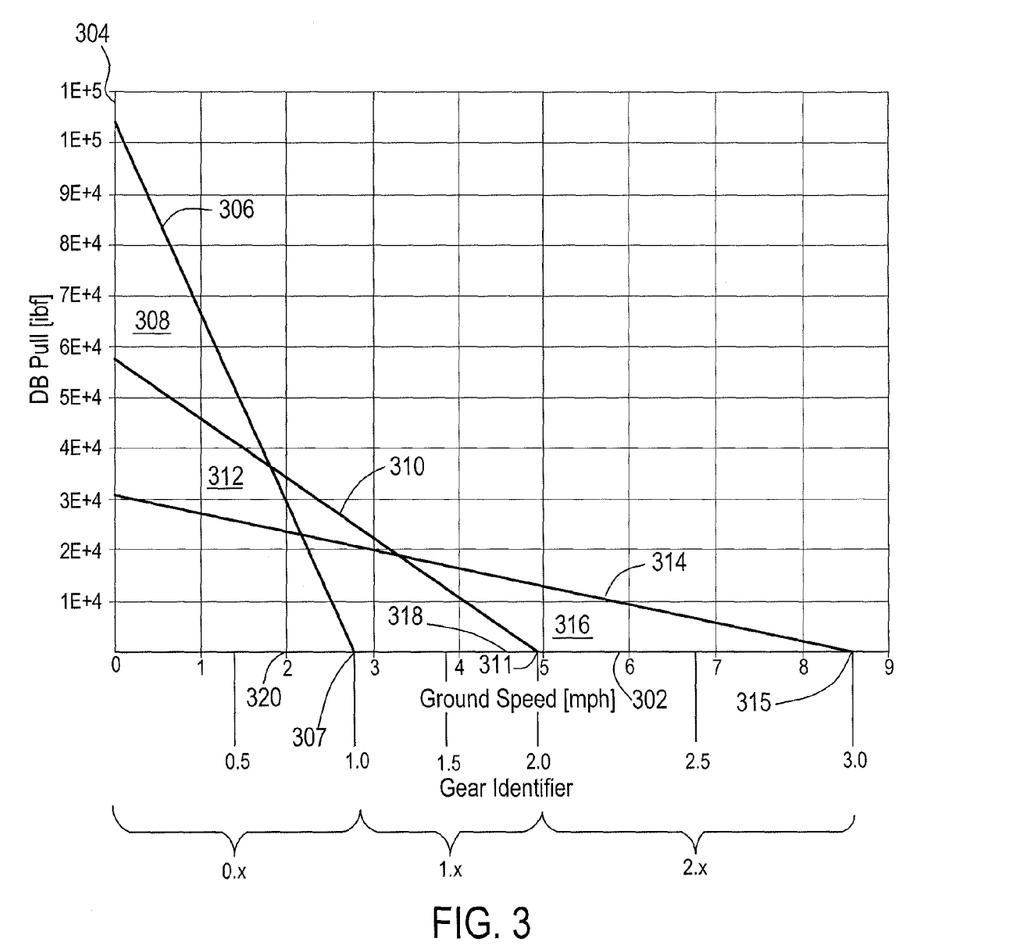
FIG. 3 is a graph illustrating certain aspects of an embodiment of a shift control in accordance with the disclosure.

A graph showing certain aspects of one embodiment of the shift control system and method disclosed herein can be seen in FIG. 3. In the graph, operating points of a machine are shown for each of three gears, where track speed of the machine, in miles per hour, and the corresponding gear identifier are arranged on the horizontal axis 302, and the drawbar pull force of the machine, expressed in pounds force, is arranged on the vertical axis 304. A first curve 306 corresponds to a collection of maximum operating points when the machine is travelling when in first gear, and bounds a generally triangular area 308 at the lower left corner of the graph. Each of the points in the area 308 represents a permissible operating pair of track speed and drawbar pull force of the machine. Each of these points also corresponds to a particular pair of engine speed and engine fueling operating conditions, with points lying on the first curve 306 representing engine operation along the lug line. Similarly, a second curve 310 bounds a second area 312 that encompasses operating points of the machine with the second gear engaged, and a third curve 314 bounds a third area 316 encompassing machine operating points with the third gear engaged.

According to an aspect of the disclosure, the operator interface 248 includes an input device and method by which the operator may select a gear identifier while still operating in an automatic shifting mode, wherein the whole number gear identifier selected corresponds to the high idle speed for the gear directly corresponding to the selected gear identifier. That is, by selecting gear identifier 1.0 on the operator interface 248, the operator selects the speed 307 at zero DB pull force in the graph illustrated in FIG. 3. By selecting gear identifier 2.0 on the operator interface 248, the operator selects the speed 311 at zero DB pull force in the graph illustrated in FIG. 3. Similarly, by selecting gear identifier 3.0 on the operator interface 248, the operator selects the speed 315 at zero DB pull force in the graph illustrated in FIG. 3.

In some embodiments, the gear identifier may include other than whole numbers, which may be, for example, in the form of a decimal point with an integer indicative of a fraction, for example, 0.1, 0.2, 0.3, 0.4, 0.5, 0.6, 0.7, 0.8, 0.9, 1.1, 1.2, etc., or any combination or subset of the same. In this way, when the operator selects a gear identifier that is other than a whole number, the machine will still be operating in the next highest whole number gear identifier. In other words, when selecting 0.x, where x is other than zero, the operator is still selecting first gear identifier, but at speed lower than the high idle speed 307 for first gear. Similarly, when selecting 1.x, where x is other than zero, the operator is still selecting second gear identifier, but at speed lower than the high idle speed 311 for second gear. Likewise, when selecting 2.x, where x is other than zero, the operator is still selecting third gear identifier, but at speed lower than the high idle speed 315 for third gear.

As can be appreciated, certain portions of the areas 308, 312 and 316 overlap either between two or all three gears. It is in these areas of machine operation that the advantages of the shift control disclosed, for example, in U.S. application Ser. No. 13/049,214 and U.S. Provisional Patent Application 61/448,035, and as realized by the speed selection arrangement as explained herein can be more readily realized in that the combination of track speed and pull force may be attained by any one of two or three different gear settings.

By way of example only, in an embodiment of the invention, where the operator selects gear identifier 1.8 (identified as 318 along the horizontal axis 302), the transmission may operate in either second or third gear, depending upon the DB pull force required by the particular operation. As a result, depending upon the particular control logic utilized, the transmission may operate in either second or third gear in order to maintain the speed 4.5 mph that corresponds to identifier 1.8 (318). By way of further example, where the operator selects identifier 0.7 (identified as 320 along the horizontal axis 302), the transmission may operate in any of first, second or third gear, depending upon the DB pull force required by the particular operation. As a result, depending upon the particular control logic utilized, the transmission may operate in first, second or third gear in order to maintain the speed 2.0 mph that corresponds to identifier 0.7 (320).

Figure 4:
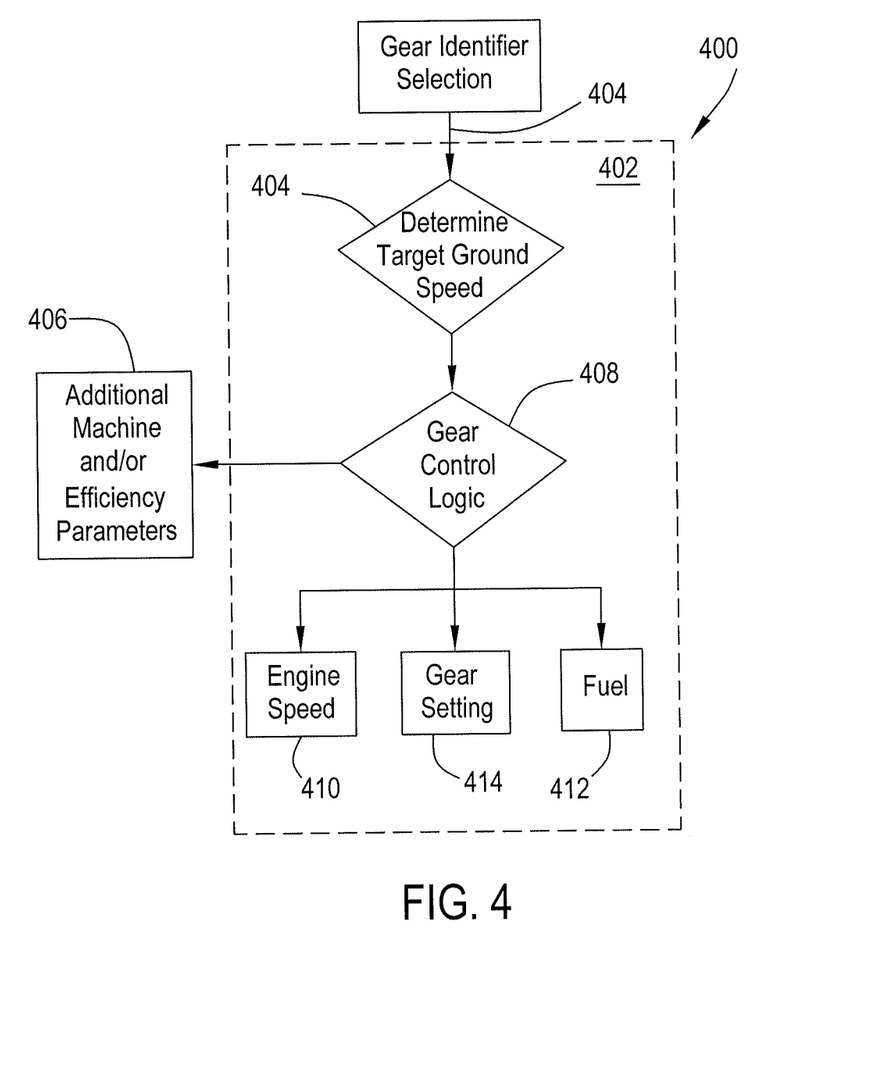
FIG. 4 is a flowchart for a method of an embodiment for operating a machine in accordance with the disclosure.

A representative block diagram for a shift control arrangement 400 for the controller 402 is shown in FIG. 4. The controller 402 may include the engine controller 220 and/or the controller 222 and the shift control arrangement 400 may operate in any appropriate form, for example, by way of computer executable instructions, hardware, or any combination thereof. The shift control arrangement 400 may further comprise a portion of a larger control scheme, with which it may exchange inputs, outputs and commands, but is shown here separate from any other such controls for purpose of simplicity.

Figure 5:
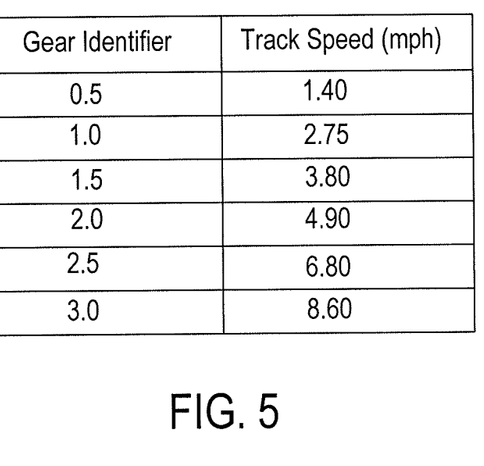
FIG. 5 is an exemplary chart of gear identifiers and corresponding track speeds for an embodiment of operating a power train of a machine in accordance with the disclosure.

As explained with regard to FIG. 3, the operator selects a gear identifier ranging from a low number, such as zero, to the maximum number of gears, for example, three in the embodiment of FIG. 3. In some embodiments, the gear identifier may also include one or more gear identifiers that are other than whole numbers, which may be, for example, in the form of a decimal point with an integer indicative of a fraction. From the gear identifier selector, such as operator interface 248, a signal 404 is provided to the controller 402. The controller 402 then determines the appropriate desired ground speed 404, based upon a correlation chart or table that reflects the correlation of the gear identifier and target ground speed as illustrated, by way of example only, in FIGS. 3 and 5.

Additional inputs signals indicative of various machine and/or efficiency parameters 406, including, for example, engine speed, torque converter speed, transmission speed, final drive speed, current gear setting, machine orientation, which is indicative, for example, of the inclination of the machine in the direction of travel, engine fueling, and other parameters may likewise be provided to the controller 402. Additional parameters 406 that can be provided to the control arrangement 400 include signals indicative of the level of fuel remaining in the machine, the level of other fluids such as urea remaining in the machine, oil life, machine operating time, adaptive parameters indicative of the work level of the machine, and the like. The parameters 406 shown as inputs to the control arrangement 400 may be provided, for example, from the various sensors shown and discussed relative to FIG. 2, such as the engine speed sensor 228, the torque converter speed sensor 232, the transmission speed sensor 236, and the final drive speed sensors 240. Parameters 406 may further include efficiency parameters, such as, for example, fuel consumption of the prime mover, expected noise generated by the prime mover, power output of the prime mover, emissions generated by the prime mover, and expected changes in power consumption of the machine.

Based upon the target ground speed as determined by the gear identifier and one or more other input signals indicative of one or more machine and/or efficiency parameters 406 received by the control arrangement 400, the control arrangement 400 performs control logic 408 to determine a desired engine speed 410, a desired engine fueling 412, and a desired gear setting 414. The control logic 408 may be any appropriate logic for determining the parameters, including, by way of specific example, the logic disclosed in U.S. application Ser. No. 13/049,214 and U.S. Provisional Patent Application 61/448,035. For example, the controller 400 may determine a desired engine speed 410, a desired engine fueling 412, and a desired gear setting 414 such that the engine controller 220 may cause the prime mover 202 to be operated at a desired speed and load output, and controller 222 may command the shift actuator 246 via the shift command line 244 to select the desired the gear setting 414 of the transmission 210 such that the desired gear ratio may be engaged. At times when the machine is not operating at a gear setting that is deemed desirable by the controller 222, the actuator 246 may up-shift or down-shift the transmission 210 in response to the gear identifier selection signal 404 such that the desired gear setting is engaged.

INDUSTRIAL APPLICABILITY

The present disclosure is applicable to power trains for various types of vehicles including work machines. The systems and methods disclosed herein are advantageously configured to provide desirable and understandable interface to operators while improving machine performance against various efficiency metrics of machine operation, such as the rate of fuel consumption. In the illustrated embodiment, a work machine is disclosed, and specifically a track-type tractor, although other machines that may be expected to require steady travel periods in their work, such as motor graders, compactors, pavers and the like may be used.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A machine having a power train that includes a prime mover connected to a transmission having at least two selectable gear settings, the machine further comprising:
   an operator interface adapted to provide an operator with a choice of gear identifiers, at least two of said gear identifiers being whole numbers, each gear identifier of a whole number corresponding to a high idle speed for a respective gear setting, the high idle speed corresponding to a speed at zero DB pull force for the gear identifier of a whole number, the operator interface further adapted to provide a signal indicative of a gear identifier selection by the operator,
   an electronic controller configured to receive signals indicative of the gear identifier selection by the operator and to receive and transmit signals indicative of machine parameters, the electronic controller containing computer executable instructions, the computer executable instructions comprising instructions for determining an optimal gear setting and whether a gear shift should be made.

2. The machine of claim 1 wherein the operator interface includes at least one gear identifier that is other than a whole number, the gear identifier that is other than a whole number being indicative of a gear identifier selection by the operator of the gear identifier of the next highest gear identifier of a whole number being operated at a reduced speed.

3. The machine of claim 1 wherein the computer readable instructions include correlating the gear identifier selection by the operator with a target ground speed.

4. The machine of claim 3, wherein the electronic controller further includes instructions for determining a ground speed of the machine and instructions for maintaining the ground speed of the machine substantially unchanged when that gear identifier is the gear identifier selection by the operator.

5. The machine of claim 1, wherein the computer readable instructions include instructions for determining a current value for at least one efficiency metric of the machine that is at least partially based on engine speed during operation at a current gear setting of the transmission.

6. The machine of claim 5, wherein the at least one efficiency metric includes one of fuel consumption of the prime mover, expected noise generated by the prime mover, power output of the prime mover, emissions generated by the prime mover, and expected changes in power consumption of the machine.

7. The machine of claim 1, wherein the computer readable instructions include instructions for determining additional machine parameters including engine speed when the optimal gear setting is selected such that a machine ground speed is maintained substantially unchanged.

8. A method for operating a machine having an engine connected to a multi-gear power-shift transmission, the engine operating at a current engine speed and providing a current torque, the method comprising:
receiving a signal indicative of a gear identifier selection from an operator interface adapted to provide an operator with a choice of at least two gear identifiers of a whole number, each gear identifier of a whole number corresponding to a high idle speed for a respective gear setting, the high idle speed corresponding to a speed at zero DB pull force for the gear identifier of a whole number,
receiving signals indicative of at least one machine parameter including ground speed,
executing a control logic to determine an optimal gear setting and whether a gear shift should be made, and
providing an indication if a gear shift from a current gear setting to an alternate gear setting is desired based upon the gear identifier selection by the operator.

9. The method of claim 8, wherein the operator interface is adapted to provide an operator with at least one gear identifier that is other than a whole number, the gear identifier that is other than a whole number being indicative of a choice of the gear identifier of the next highest gear identifier of a whole number being operated at a reduced speed.

10. The method of claim 8, further including correlating the gear identifier selection by the operator with a target ground speed.

11. The method of claim 10, further including determining the ground speed of the machine, and maintaining the ground speed of the machine substantially unchanged when the gear identifier selection by the operator is unchanged.

12. The method of claim 8, further including determining a current value for at least one efficiency metric of the machine that is at least partially based on engine speed during operation at a current gear setting of the transmission.

13. The method of claim 8, further including determining additional machine parameters including engine speed when the optimal gear setting is selected such that the machine ground speed is maintained substantially unchanged.

14. The method of claim 8, further including receiving a signal indicative of an efficiency parameter.

15. The method of claim 14 wherein the efficiency parameter is indicative of fuel economy.

16. The method of claim 8, further including providing a command configured to cause the transmission to shift from the current gear setting to the alternate gear setting when the indication that a gear shift from the current gear setting to the alternate gear setting is desired is provided.

17. A power train including an engine connected to a multi-gear power-shift transmission, the transmission adapted to operate a drive system at a desired ground speed and power output, the power train further comprising an electronic controller configured to:
receive a signal indicative of a gear identifier selection from an operator interface adapted to provide an operator with a choice of at least two gear identifiers of a whole number, each gear identifier of a whole number corresponding to a high idle speed for a respective gear setting, the high idle speed corresponding to a speed at zero DB pull force for the gear identifier of a whole number,
receive signals indicative of at least one machine parameter including ground speed,
execute a control logic to determine an optimal gear setting and whether a gear shift should be made, and
provide an indication to initiate a gear shift if the gear shift from the current gear setting to an alternate gear setting is desired based upon the gear identifier selection by the operator.

18. The power train of claim 17, wherein the operator interface is adapted to provide an operator with at least one gear identifier that is other than a whole number, the gear identifier that is other than a whole number being indicative of a gear identifier selection by the operator of the gear identifier of the next highest gear identifier of a whole number being operated at a reduced speed.

19. The power train of claim 17, wherein the controller is further configured to correlate the gear identifier selection by the operator with a target ground speed.

20. The power train of claim 19, wherein the controller is further configured to determine the ground speed of the machine, and maintain the ground speed of the machine substantially unchanged for the gear identifier selection by the operator.

* * * * *